(12) United States Patent
Maggio et al.

(10) Patent No.: US 6,882,689 B2
(45) Date of Patent: Apr. 19, 2005

(54) PSEUDO-CHAOTIC COMMUNICATION METHOD EXPLOITING SYMBOLIC DYNAMICS

(75) Inventors: Gian Mario Maggio, San Diego, CA (US); Luca Reggiani, Ferrara (IT)

(73) Assignee: The Regents of the University of California, Oakland, CA (US)

( * ) Notice: Subject to any disclaimer, the term of this patent is extended or adjusted under 35 U.S.C. 154(b) by 864 days.

(21) Appl. No.: 09/734,965

(22) Filed: Dec. 12, 2000

(65) Prior Publication Data

US 2002/0172291 A1 Nov. 21, 2002

(51) Int. Cl.[7] .............................................. H04L 27/00
(52) U.S. Cl. ...................................... 375/259; 380/46
(58) Field of Search .............................. 375/259, 343, 375/377; 380/263, 46, 48

(56) References Cited

U.S. PATENT DOCUMENTS

| | | | |
|---|---|---|---|
| 5,243,303 A | * | 9/1993 | Murata et al. ................. 331/78 |
| 5,923,760 A | * | 7/1999 | Abarbanel et al. ............. 380/34 |
| 6,212,239 B1 | * | 4/2001 | Hayes ........................ 375/259 |
| 6,331,974 B1 | * | 12/2001 | Yang et al. .................. 370/342 |

OTHER PUBLICATIONS

Douglas R. Frey, "Cahotic Digital Encoding: an Approach to Secure Communication" vol. 40, Oct. 10, 1993, IEEE.*
Gian Maggio, N. Rulkov, M. Sushchik, L. Tsimring, A. Volkovskii, H. Abarbanel, L. Larson and K. Yao, "Chaotic Pulse–Position Modulation for Ultrawide–Band Communication Systems," pp. 1–6, Nov. 2000, posted on World Wide Web Nov. 1999.

Gian Maggio, N. Rulkov, L., Reggiani, "Chaotic Pulse–Position Modulation for UWB Impulse Radio," *IEEE Trans. Circuits and Systems–I*, pp. 1–16, unpublished.

Gian Maggio, N. Rulkov, L. Tsimring, A. Volkovskii, H. Abarbanel, L. Larson, K. Yao, "Chaotic Pulse–Position Modulation for UWB Systems," Proc. *UWB Conference*, pp. 1–25, Washington, DC, Sep. 28–30, 1999.

* cited by examiner

*Primary Examiner*—Khai Tran
(74) *Attorney, Agent, or Firm*—Greer, Burns & Crain, Ltd.

(57) ABSTRACT

A pseudo-chaotic coding/modulation method. The coding method exploits symbolic dynamics of a chaotic map at the transmitter to encode data. The encoding synthesizes the chaotic map based upon the data to be transmitted. In a preferred embodiment, pseudo-chaotic iterates are generated from a digital implementation of a Bernoulli shift map. The output of the shift map is translated by a mapping, preferably implemented by a digital signal processor, to allow transitions between states in a transmitted signal to differ, and the translated map is used to drive a modulator (for example PPM, FSK, PSK, QAM, etc.). In the specific case of pulse-position modulation (PPM) the translated map is used to modulate pulse train positions within a periodic synchronization frame. The preferred embodiment uses a shift register to implement an approximation of the Bernoulli shift map acting as a form of convolutional code with a number of states equal to the symbolic states defined on the chaotic map. A receiver may use fewer states and still decode the data signal, allowing receiver scalability.

16 Claims, 8 Drawing Sheets

PSEUDO-CHAOTIC COMMUNICATION METHOD EXPLOITING SYMBOLIC DYNAMICS

This invention was made with government assistance provided by the Army Research Office (DAAG55-98-1-0269). The government has certain rights in this invention.

FIELD OF THE INVENTION

The field of the invention is data communication. The invention is particularly applicable to ultra-wide bandwidth impulse-radio communication systems.

BACKGROUND OF THE INVENTION

The continually increasing reliance on wireless forms of communication creates reliability and privacy problems. Data should be reliably transmitted from a transmitter to a receiver. In particular, the communication should be resistant to noise, interference, and possibly to interception by unintended parties.

In the last few years there has been a rapidly growing interest in ultra-wide bandwidth (UWB) impulse radio (IR) communication systems. These systems make use of ultra-short duration pulses that yield ultra-wide bandwidth signals characterized by extremely low power spectral densities. UWB-IR systems are particularly promising for short-range wireless communications as they combine reduced complexity with low power consumption, low probability of detection (LPD), immunity to multipath fading, and multi-user capabilities. Current UWB-IR communication systems employ pseudo-random noise (PN) coding for channelization purposes and pulse-position modulation (PPM) for encoding the binary information.

Others have proposed a periodic sequences of pulses in the context of chaos-based communication system. Additional work has relied upon the self-synchronizing properties of two chaotic systems. In such a system, data is modulated into pulse trains using variable time delays and is decodable by a coherent receiver having a chaotic generator matched to the generator used in the transmitter. Such system is known in the art as a Chaotic Pulse Position Modulation (CPPM) scheme.

Such chaotic dynamical systems have been proposed to address the problem of communication privacy. Chaotic signals exhibit a broad continuous spectrum and have been studied in connection with spread-spectrum applications. The irregular nature of a chaotic signal makes it difficult to intercept and decode. In many instances a chaotic signal will be indistinguishable from noise and interference to receivers not having knowledge of the chaotic signal used for transmission. In the context of UWB systems the use of nonperiodic (chaotic) codes enhances the spread-spectrum characteristics of the system by removing the spectral features of the signal transmitted. This results in a lower probability of interception/detection (LPI/LPD) and possibly less interference towards other users. This makes the chaos-based communication systems attractive.

There remains a need for improved chaotic coding/modulation methods to produce such attractive communication systems. It is an object of the invention to meet that need.

SUMMARY OF THE INVENTION

The invention is a pseudo-chaotic coding/modulation method. The coding method of the invention exploits symbolic dynamics of a chaotic map at the transmitter to encode data. This produces an encoding system that synthesizes the chaotic map based upon the data to be transmitted.

In a preferred embodiment, pseudo-chaotic iterates are generated from a digital implementation of a Bernoulli shift map. The output of the shift map is translated by a mapping, preferably implemented by a digital signal processor, to allow transitions between states in a transmitted signal to differ, and the translated map is used to drive a modulator (for example PPM, FSK, PSK, QAM, etc.). In the specific case of pulse-position modulation (PPM) the translated map is used to modulate pulse train positions within a periodic synchronization frame. The preferred embodiment uses a shift register to implement an approximation of the Bernoulli shift map acting as a form of convolutional code with a number of states equal to the symbolic states defined on the chaotic map. A receiver may use fewer states and still decode the data signal, allowing receiver scalability.

A preferred transmitter accepts digital data for coding. The digital data is allocated to symbolic states according to a chaotic map. The pseudo-chaotically coded data is converted to analog form and modulated into synchronization frames in a transmitted signal.

Another preferred embodiment accepts digital data for coding. The digital data is encoded by applying a chaotic map having N states, where $N=2^M$, with M being the number of bits in the shift register implementing the Bernoulli shift map. The symbolic states are defined on the chaotic map according to a Markov partition and the sequence of the states constitutes the encoder output. The pseudo-chaotically coded data is converted to analog form and modulated to produce a modulated signal for transmission.

The preferred embodiments thus include features to produce useful coding, decoding, and modulation methods. Artisans will understand the important features may be applied to communication systems in different ways while still realizing advantages of the invention.

BRIEF DESCRIPTION OF THE DRAWINGS

Other features, objects and advantages of the invention will be apparent by reference to the detailed description and the drawings, of which.

DETAILED DESCRIPTION OF THE PREFERRED EMBODIMENTS

Figure 1:
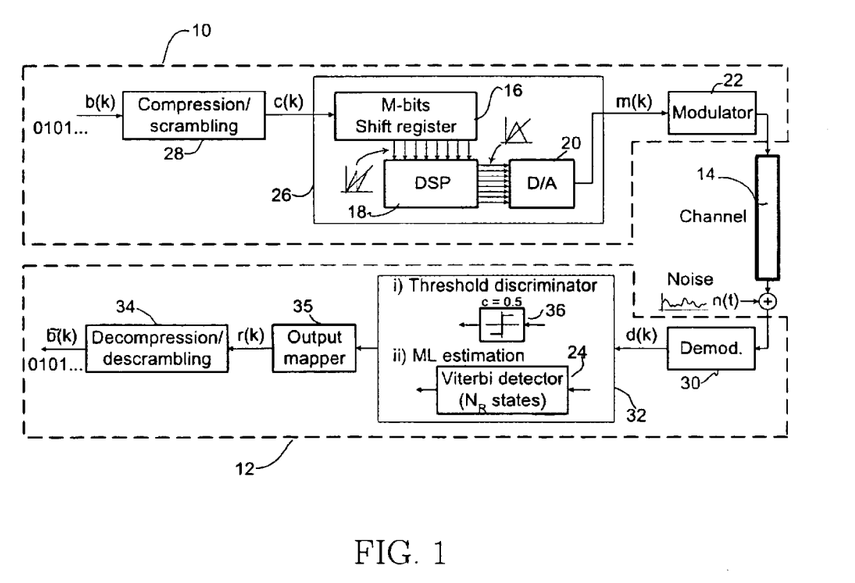
FIG. 1 is a block diagram of a preferred pseudo-chaotic coding/modulation method of the invention.

Referring now to FIG. 1, a preferred embodiment system constructed according to the invention includes a transmitter/encoder 10 that communicates with at least one receiver/decoder 12 over a channel 14, typically (but not necessarily) a wireless channel. The encoder 10 accepts a data stream and transmits data into the channel 14 using a pseudo-chaotic encoding. In the preferred embodiment, coding is conducted primarily by a shift register 16 that implements an approximation of a Bernoulli shift and a digital signal processor 18. The digital signal processor translates dynamics of the Bernoulli shift register, while permitting simple transformations, e.g. a Gray/binary conversion, or the realization of more complex pseudo-chaotic maps, which might be used for spectral shaping purposes and/or to enhance maximum likelihood detection by the receiver/decoder 12. Output from the digital signal processor is converted by a D/A converter and used to modulate data in a modulator 22. In a preferred embodiment, pulse-position modulation is used in a periodic synchronization frame. In general, the symbolic dynamics approach enables realization of a Viterbi detector 24 in the receiver with a number NR of states lower than the levels in the transmitter.

I. Encoding

A. Shift Map

In the preferred embodiment of FIG. 1, the shift register 16 implements a shift of an incoming bit stream. In considering the preferred embodiment and the implemented shift, symbolic dynamics theory will be helpful in aiding understanding of the invention. We first consider the shift map and resulting symbolic dynamics. $\Sigma_2$ indicates the symbol space of binary "0"s and "1"s, that is $\Sigma_2 = \{(s_0 s_1 s_2 \ldots): s_i = 0 \text{ or } s_i = 1\}$. Then, the shift map $\sigma: \Sigma_2 \to \Sigma_2$ is defined in Equation (1) as:

$$\sigma(s_0 s_1 s_2 \ldots) = s_1 s_2 s_3 \quad (1)$$

that is the shift map simply "forgets" the first entry in a sequence, and shifts all other entries one position to the left. Incidentally, the shift map is perhaps the simplest example of chaotic dynamics and it possesses all the peculiar features of chaotic systems.

An equivalent way of studying the shift map is to represent the state x of the corresponding discrete (one-dimensional) dynamical system as a binary expansion, as in Equation (2):

$$x = 0 \cdot b_1 b_2 b_3 \ldots \equiv \sum_{j=1}^{\infty} 2^{-j} b_j \quad (2)$$

where each of the bits $b_j$ is either a "0" or a "1", and $x \in [0,1]$. Then, the effect of the shift map applied to the binary sequence $\{b_j\}_{j=1}^{\infty}$ is described by the so-called Bernoulli shift map of Equation (3):

$$x_{k+1} = 2x_k \bmod 1 \quad (3)$$

Figure 2:
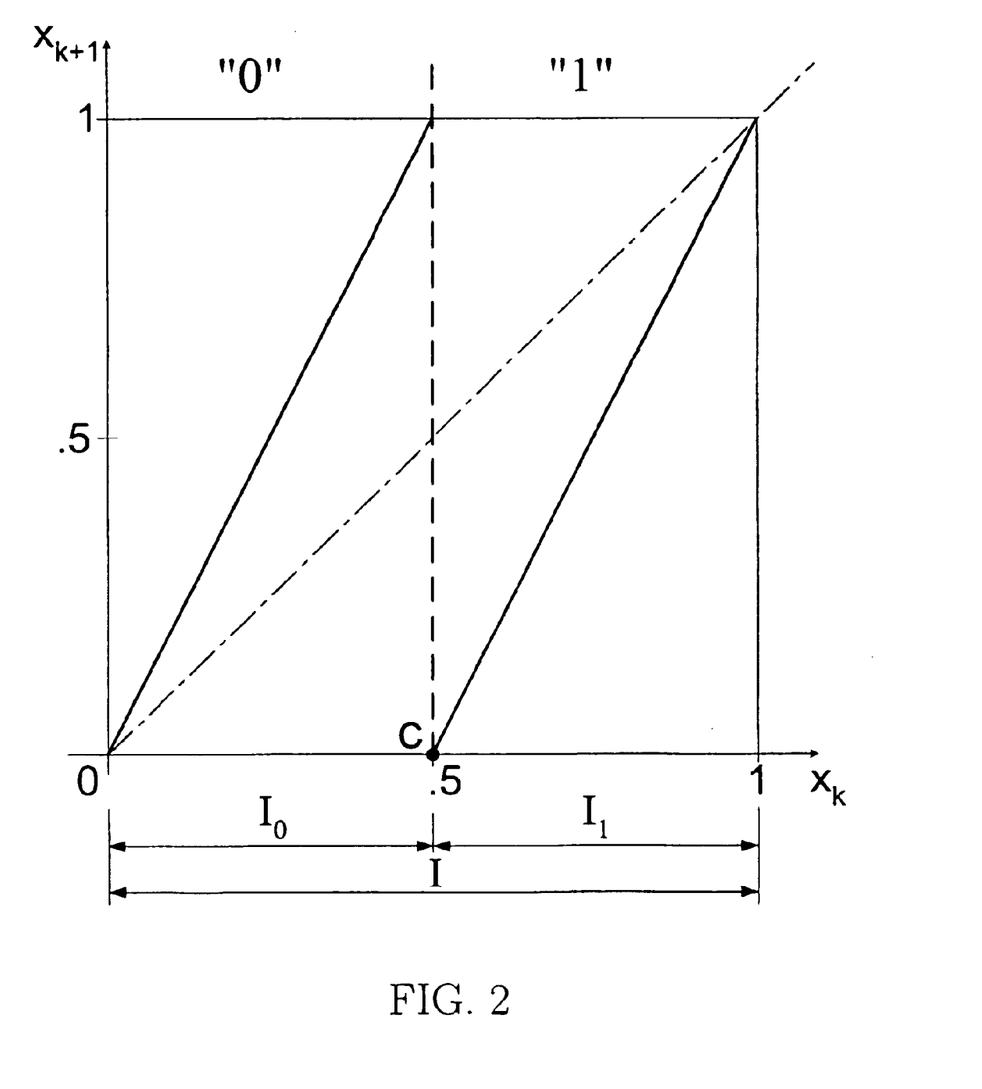
FIG. 2 illustrates a Bernoulli shift map with the definition of the symbolic dynamics in accordance with a preferred embodiment of the invention.

A graph representing the Bernoulli shift map is shown in FIG. 2. Referring to Equation (3), successive iterates of x are obtained by moving the separating point one position to the right (multiplication by 2) and setting to zero the first integer digit (modulo operation). Hence, digits which are initially far to the right of the separating point, and thus have only a very slight influence on the value of x eventually become the first fractional digit. In sum, a small change of the initial conditions eventually makes a large change in $x_k$, confirming the sensitivity to initial conditions of the chaotic Bernoulli shift.

B. Symbolic Dynamics

Symbolic dynamics may be defined as a "coarse-grained" description of the evolution of a dynamical system. The idea is to partition the state space and to associate a symbol to each partition. Then, a trajectory of the dynamical system can be analyzed as a symbolic sequence. In the case of the Bernoulli shift map, shown in FIG. 2, the state space is represented by the invariant interval $I=[0,1]$. As mentioned, the first step for characterizing the symbolic dynamics of a given dynamical system consists of introducing a proper partition of the state space. To ensure that the symbolic dynamics give rise to a topological Markov chain, a so-called Markov partition has to be selected. In the case of the Bernoulli shift map (with N=2), a Markov partition may be selected by simply splitting the interval $I=[0, 1]$ with respect to the critical point $c=0.5$ and, correspondingly, we define the two subintervals $I_0=[0, 0.5)$ and $I_1=[0.5, 1)$, as illustrated in FIG. 2.

In order to obtain a symbolic description of the dynamics of the chaotic map under consideration, FIG. 2 associates the binary symbol "0" to the subinterval $I_0$ and the symbol "1" to the subinterval $I_1$. Then, the evolution of the state of the Bernoulli map can be described in terms of a symbolic sequence $S=\{010010 \ldots\}$.

C. Shift Register and DSP

The basic idea behind the symbolic dynamics encoder 26, which includes the shift register 16, DSP 18, and D/A converter 20 in FIG. 1, is that the Bernoulli shift process may be implemented by means of an infinite length shift register R where at each step the most significant bit (MSB) is discarded. The shift operation corresponds to a multiplication by a factor 2, while discarding the MSB at each step is equivalent to a modulo 1 operation.

Figure 3A:
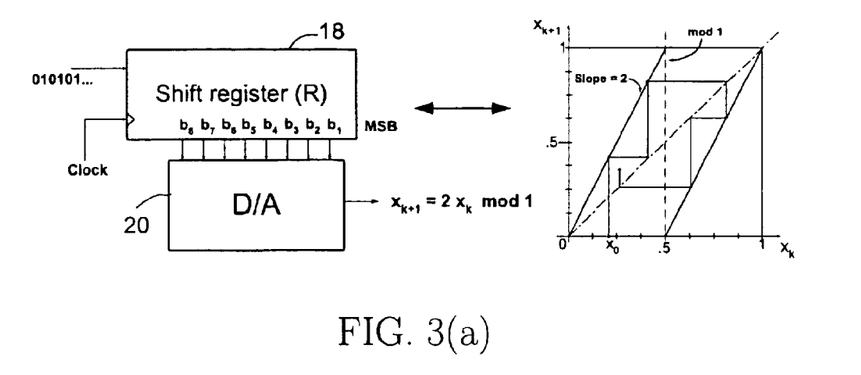
FIG. 3(a) illustrates implementation of the Bernoulli shift map through the M-bit shift register and D/A converter of FIG. 1.

A practical shift register, of course, has finite length and on the other hand it is impossible to specify the initial conditions with infinite precision. Encoding binary data exploiting the Bernoulli shift map requires consideration of a finite-length shift register R that is fed with a binary data stream c(k) to be transmitted. We assign the most recent bit of data the least significant bit (LSB) position in the shift register 16. At each step (or clock impulse) the new bit of data is copied into the LSB position of the shift register while the (old) MSB is discarded. The situation is depicted in FIG. 3(a).

We assume that the binary data stream c(k) feeding the shift register is an i.i.d. (independently identically distributed) sequence. A randomization of a data stream may be obtained, if desirable, by use of a data compressor and/or a data scrambler 28, as shown in the preferred FIG. 1 embodiment, to pre-code the data stream prior to entry into the shift register 16.

1. State Quantization

Figure 3B:
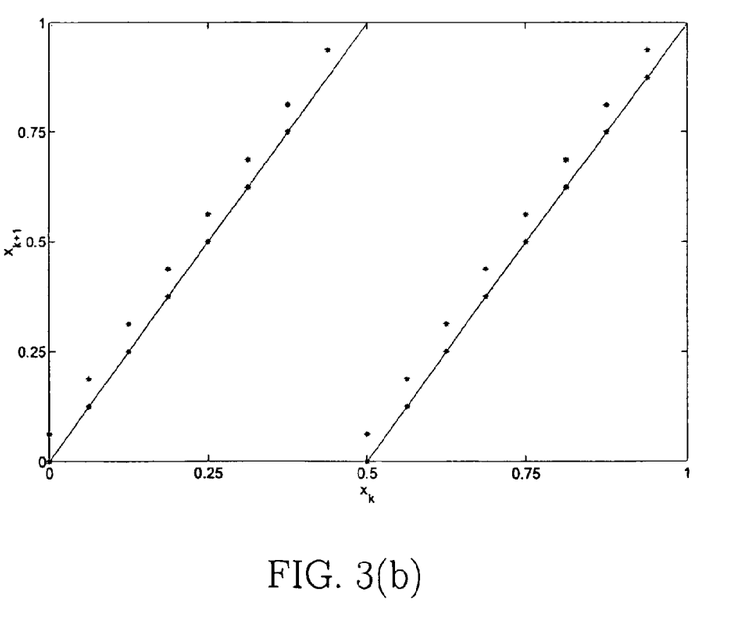
FIG. 3(b) illustrates the effect on state quantization by the shift register of FIG. 3(a) with M=4.

In practice, due to the finite length of the shift register R, the dynamics of the Bernoulli shift can only be approximated, as the admissible states assume only discrete values. Namely, by considering a M-bit shift register, the generic state x can be expressed as:

$$x = 0 \cdot b_1 b_2 \ldots b_M \equiv \sum_{j=1}^{M} 2^{-j} b_j \quad (4)$$

to be compared with Equation (2), where $b_1$ and $b_M$ represent the MSB and the LSB, respectively. Obviously, the approximation can be made arbitrarily precise by increasing the length M of the shift register. The effect of the state quantization on the Bernoulli shift map is shown in FIG. 3(b), for the case M=4.

D. Control of Chaos in the Transmitter

The preferred embodiment transmitter implements a form of predictive control with respect to the symbolic dynamics of the Bernoulli shift, with the state definition given by Equation (4). The symbolic dynamics of the Bernoulli shift with the Markov partition are determined solely by the successive values of the MSB in the shift register R. Referring to Equation (4), the first bit on the right of the separating point determines whether the iterate falls within $I_0$ or $I_1$ (the remaining bits deciding only the relative position within $I_j$ with j=0, 1). The value of the MSB at step k coincides with the value of the LSB M steps before, at step (k−M). In turn, the LSB contains the current bit of data c(k). In this sense, the scheme is predictive in its nature.

The present invention solves the control problem a priori, by direct "synthesis" of the pseudo-chaotic signal, starting from the binary data to be transmitted. From this perspective, the injection of a new bit of data in the LSB of the shift register 16 may be interpreted as a perturbation of the state of the dynamical system, in order to make it follow the desired symbolic sequence. The strength of the perturbation is of the order of $2^{-M}$, thus can be made arbitrarily small by increasing the number M of bits of the shift register.

E. Map Shaping/Translation

Figure 4:
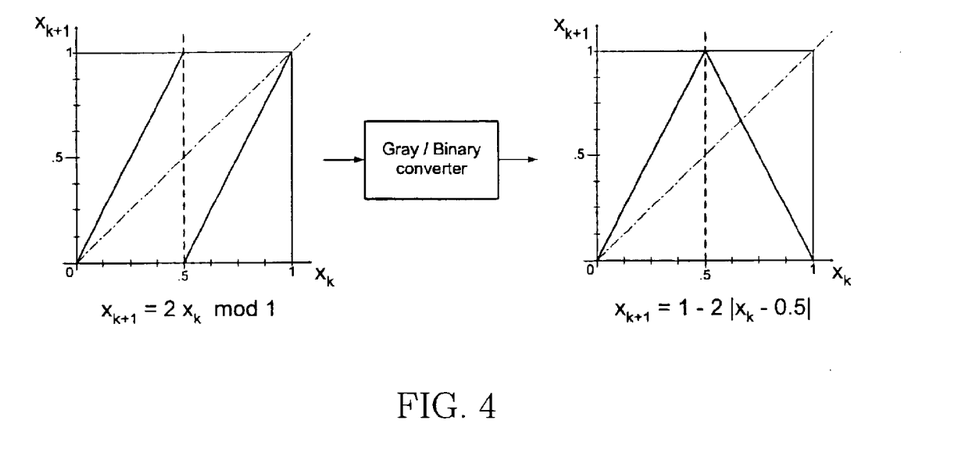
FIG. 4 illustrates an effect of a Gray/binary translation from the Bernoulli shift map to a tent map.

The digital signal processor 18, in FIG. 1, may be realized by a Gray/binary converter. The purpose of the Gray/binary conversion is to translate the dynamics of the Bernoulli shift map, given by Equation (3), into those of the tent map, described by:

$$x_{k+1} = 1 - 2|x_k - 0.5| \quad (5)$$

as illustrated in FIG. 4. This is done in order to achieve a greater robustness of the system in presence of noise by avoiding (zero-order) discontinuities in the map. The tent map has very similar dynamics to the Bernoulli shift map; in particular, both admit the same constant invariant density. Also, their symbolic dynamics with respect to the Markov partition can be related to each other.

In the preferred embodiment, however, the digital signal processor 18 is capable of generating more complex chaotic maps. This may be useful for spectral shaping purposes and/or for enhancing the Maximum-Likelihood detection.

F. Modulation to Produce a Transmitted Signal.

The signal from the digital signal processor is transformed into an analog signal by the D/A converter 20, which is used to drive the modulator 22. In the case of PPM a constant offset is then added to this analog signal to form the modulation signal m(t) and used to drive a Pulse Position Modulator. Please note that the following two sections assume the modulator 22 conducts PPM.

1. Synchronization Frame

Figure 5:
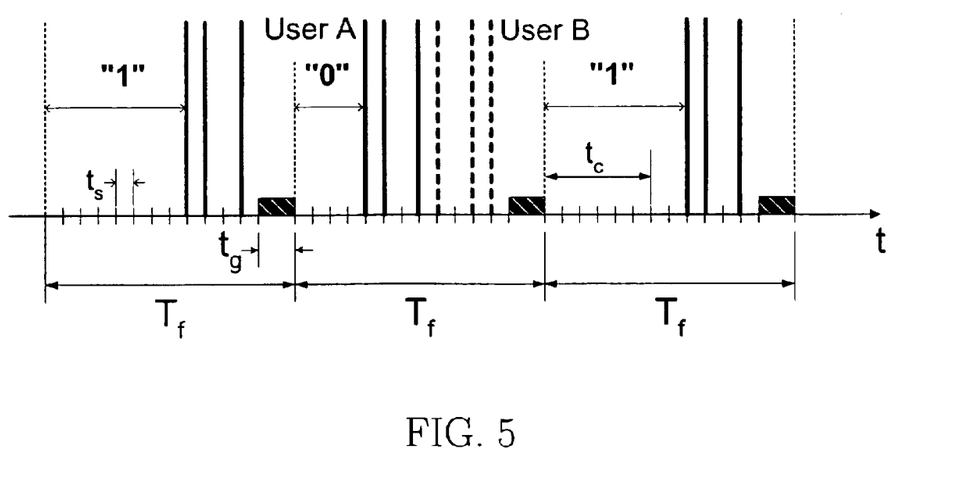
FIG. 5 illustrates a preferred periodic synchronization frame for the modulation conducted by the transmitter of FIG. 1 when pulse-position modulation is used.

In the preferred embodiment, each pulse is allocated, according to the pseudo-chaotic modulation signal, within a periodic synchronization frame, as shown schematically in FIG. 5. This assumes the existence of a periodic reference (with period $T_f$) such that only one pulse train (or in the simplest case a single pulse) for each user (User A or User B in FIG. 5) is transmitted within each frame time $T_f$, coinciding with the symbol period. In FIG. 5, each frame time includes a "guard" time interval, $t_g$, (proportional to the constant offset) for avoiding overlapping between adjacent pulse trains. Each pulse can occur at any of $N=2^M$ (discrete) time instants, where M is the number of bits of the shift register 16 and of the D/A converter 20. In FIG. 5, the timeslot corresponding to each level of the pulse-position modulation has been denoted by $t_s$. Note that the value of $t_s$ is limited from below by the system time-base resolution.

Consider the case of data encoding in accordance with the symbolic dynamics of the tent map. Consider the exemplary partition with respect to the critical point c=0.5, and indicate with $t_c$ the corresponding time delay from the beginning of the frame. Then, by indicating with $t_k$ the relative time (again referred to the beginning of the frame) at which the k-th pulse train begins, if $t_k < t_c$ a "0" is being transmitted, while a "1" is being transmitted if $t_k > t_c$. The situation is shown in FIG. 5. The use of a synchronization frame enhances the robustness of coding in the presence of noise and spurious pulses by preventing error propagation phenomena.

2. Multilevel PPM

Modulation conducted in accordance with the invention may be considered a N-PPM multilevel modulation with input bit "coded" through the pseudo-chaotic map with rate 1/M, where $M = \log_2(N)$, realizing a sort of random coded modulation. For every user bit, a number of M channel bits are transmitted and detected. $N_R$ indicates the number of levels at the receiver. According to the invention, this may differ from the number N of levels at the transmitter. In particular, the relation $N_R \leq N$ holds, allowing a certain degree of freedom in the design of the receiver 12, and admitting classes of receivers having different complexity levels which are still capable of decoding a signal modulated in accordance with the invention.

II. Decoding

The receiver 12 decodes the signal from the channel 14. The receiver 12 includes a demodulator 30, a decoder 32 matched to the chaotic map, an output mapper and a decompression/descrambling block 34.

A. Pulse Position Demodulation

In FIG. 1, the ideal detection of the incoming pulses (affected by noise) is achieved by a pulse position demodulator (PPD) 30 consisting of a pulse correlator matched to the pulse shape and a decision circuit. In the simple case of a single pulse per frame, the PPD 30 may be realized by an Integrate and Dump (I&D) filter which estimates the position of the pulse within each frame time. We assume that a normalized signal $d(t) \in [0, 1]$ is available as output of the PPD.

B. Threshold Discriminator

Figure 6:
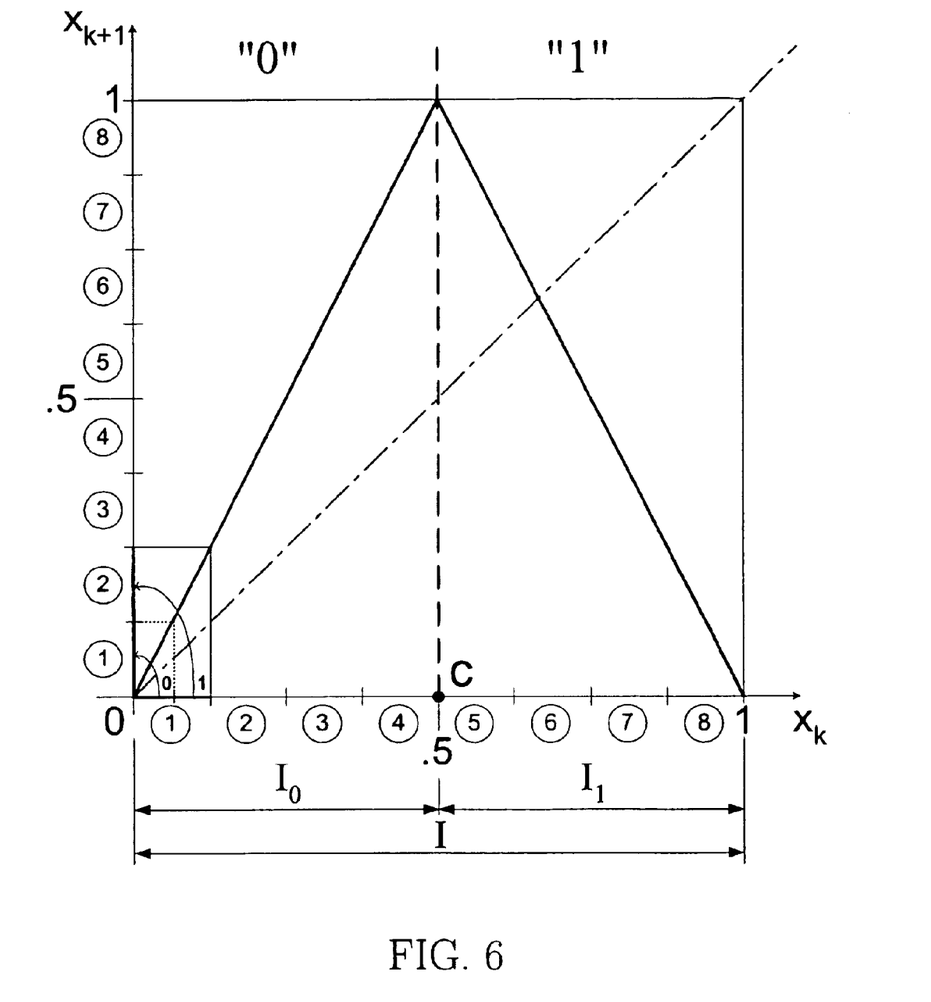
FIG. 6 shows the tent map having the same definition of the symbolic dynamics as in FIG. 2 and illustrating the symbolic states definition according to a Markov partition with N=8 states.

Demodulated data must be decoded by a decoder 32. In the simplest case the demodulator output d(t) can be decoded by a simple threshold decoder. The decoder is followed by an output mapper 35 and a decompressor/descrambler 34. A decision threshold 36 in the decoder 32 should be set according to the partition corresponding to $N_R = 2$, for example to the value c=0.5, coinciding with the critical point of the tent map as shown in FIG. 6.

1. Coding for Noise Resistance

With the threshold detection, it is reasonable to expect that most of the error events will originate from pulses corresponding to values of the pseudo-chaotic iterates close to the partition point of the tent map (c=0.5), separating the symbol "0" from the symbol "1". To reduce this particular error event probability a noise "gap" may be created in the chaotic map around its partition point c. This can be obtained by a proper pre-encoding of the data, establishing forbidden sequences of bits. One possibility is to add a code that avoids series of consecutive zeros. This constraint is usually known as run-length limit constraint and denoted by RLL (0, k), where k indicates the maximum number of allowed consecutive zeros.

C. Viterbi Detection/Maximum-Likelihood Estimation

The Viterbi detector 24 performs a Maximum-Likelihood (ML) estimation of the transmitted sequence. Other techniques for deriving a sub-optimal estimator for a chaotic process in additive white Gaussian noise (AWGN) may also be used.

1. The Tent Map as a Markov Chain

Consider again the Markov partition of the invariant interval I=[0, 1] of the tent map in N "states". The situation is illustrated in FIG. 6, for the case N=8. From FIG. 6, transitions between different states are governed by the dynamics of the map. In particular, only certain transitions (in this case two) are allowed from each state. For example, referring to FIG. 6, it is clear that the interval corresponding to the state 1 can only map to itself or to the state 2. More precisely, the transition taking place depends on which subinterval associated with each state, the generic iterate $x_k$ belongs to. These two possible transitions have been labeled with 0 and 1, respectively.

Figure 7:
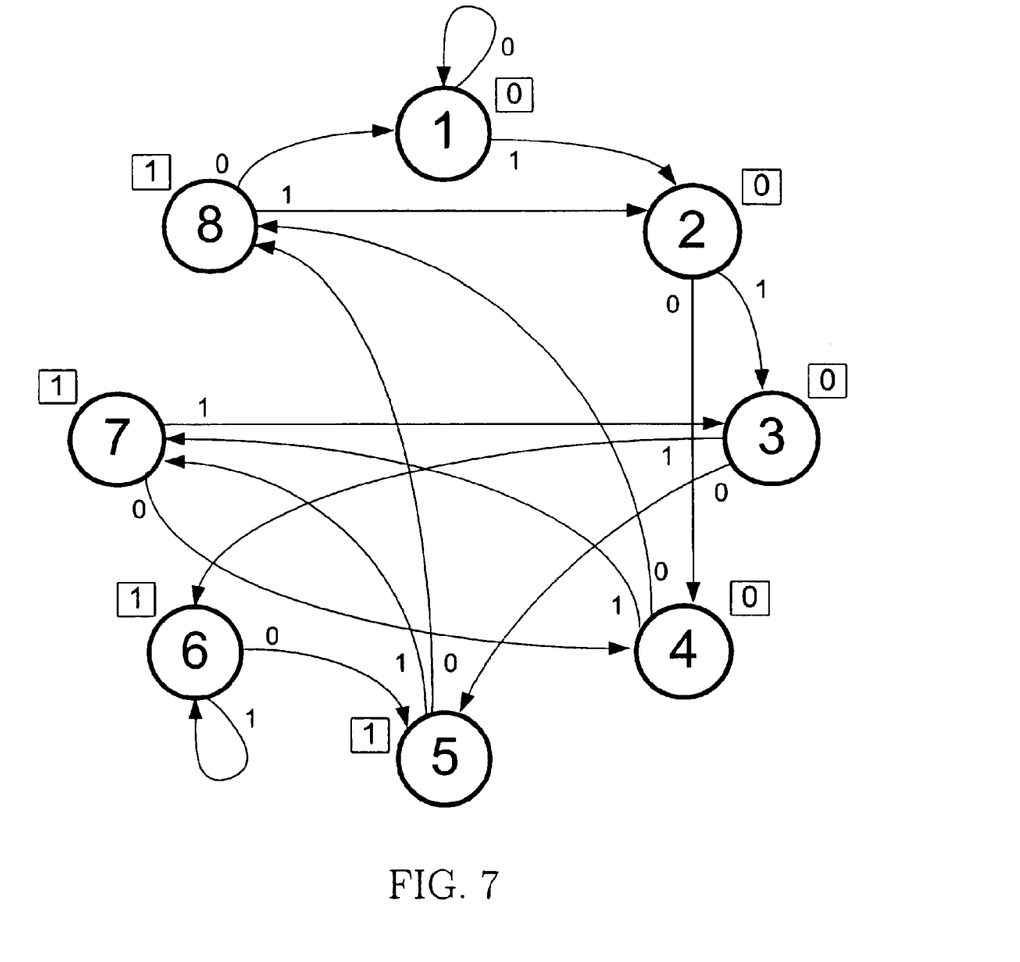
FIG. 7 illustrates the transition state diagram associated to the dynamics of the tent map with the state definition illustrated in FIG. 6.
Figure 8:
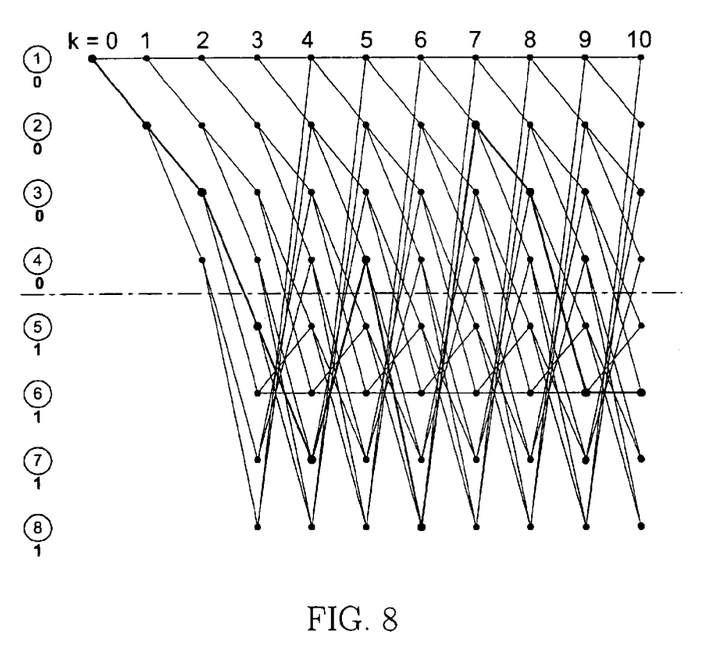
FIG. 8 illustrates the trellis diagram associated with the transition state diagram of FIG. 7.

Now, the Markov chain associated with the tent map (with the partition in FIG. 6) can be represented by means of an equivalent transition diagram, as illustrated in FIG. 7. The transition branches have been labeled according to the finer partition in subintervals, as discussed above and illustrated in FIG. 6. FIG. 7 also shows (within a box) the value of the output corresponding to each state, according to the encoding of the data. The trellis corresponding to the transition diagram of FIG. 7 is shown in FIG. 8

2. Detector Scalability

An interesting feature of the invention is the possibility of realizing the Viterbi detector 24 with a number $N_R$ of states lower than the states used by a transmitter to encode data. This is obtained simply by matching the Viterbi detector 24 at the receiver 12 to the map with a lower number of states. Given the transmitter number of states, N, there is a broad range of possibilities for decoding the signal produced by a transmitter implementing the invention. Receivers having Viterbi detectors with complexities $N_R$=2, 4, 8, . . . N, are possible. This scalability property enables receivers having different complexities and performance to decode the same transmitted signal.

3. Output Mapper/Decoding Other than Gray Conversion

When a generic chaotic map is implemented by the DSP 18 in the transmitter 10, the receiver 12 should include a further function after the detector 32 in order to exploit the scalability feature. This additional function reconstructs the transmitted message given the estimated sequence of states provided by the detector 32 itself. This function is an output mapper, that will be, in general, a finite state machine (FSM). For particular cases and for appropriate choices of the input/output labels of the encoding map like in the Bernoulli shift and in the tent map, this FSM is not necessary.

III. Multi-User Access

Artisans will appreciate that the invention is amenable of multi-user access. For example, in the case of PPM multiple-access of the channel may be realized by assigning different pulse trains for each user and correspondingly different matched filters at the receiver side. The situation is illustrated schematically in FIG. 5, showing pulse trains associated to two different users, User A and User B. Other multiplexing techniques, like for example time-division multiplexing (TDM), may be also utilized for multiple-access purposes.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A data coding method comprising:
    accepting digital data for coding;
    pseudo-chaotically coding the digital data by allocating the digital data to a state sequence assigned according to a chaotic map;
    converting the pseudo-chaotically coded data to analog form and modulating the pseudo-chaotically coded data into synchronization frames.

2. The data coding method according to claim 1, wherein said step of pseudo-chaotically coding comprises:
    shifting the digital data in a shift register with a most recent bit of information in a given clock cycle of shift register operation being assigned as a least significant bit in the shift register and the oldest bit being discarded.

3. The data coding method according to claim 1, wherein said step of pseudo-chaotically coding comprises assigning a state sequence according to symbolic dynamics defined on the chaotic map, wherein a Markov partition identifies symbolic states and transitions associated to the digital data.

4. The data coding method according to claim 1, wherein said step of modulating comprises assigning a position of a pulse train within a synchronization frame for each transmitted bit(s), the synchronization frame being partitioned, according to symbolic dynamics defined on the chaotic map.

5. The data coding method according to claim 1, further comprising a step of randomizing the digital data prior to said step of pseudo-chaotically coding.

6. The data coding method according to claim 5, wherein said step of randomizing comprises a step of compressing the digital data according to a data compression algorithm.

7. The data coding method according to claim 5, wherein said step of randomizing comprises scrambling the data according to a scrambling algorithm.

8. The data coding method according to claim 1, wherein said step of modulating allows a guard interval between synchronization frames.

9. The data coding method according to claim 1, wherein said step of pseudo-chaotically coding comprises steps of:
    shifting the digital data into the shift register, wherein the shift register operation approximates the dynamics of a Bernoulli shift map of the form $X_{K+1}=2X_K \bmod (1)$, and
    converting the shifted digital data according to a conversion of the form $X_{K+1}=1-2|X_K-0.5|$.

10. A data coding and decoding method, the method comprising steps of:
    accepting digital data for coding;
    pseudo-chaotically coding the digital data by applying a chaotic map having N states;
    converting the pseudo-chaotically coded data to analog form;
    modulating the pseudo-chaotically coded data to produce a modulated signal;
    transmitting the modulated signal over a channel;
    receiving, at a receiver, a signal from the channel;
    decoding the pseudo-chaotically coded data from the signal, the decoding comprising Viterbi detection matched to the chaotic map with N or fewer than N states.

11. The method according to claim 10,
wherein said step of pseudo-chaotically coding comprises assigning a state sequence according to symbolic dynamics defined on the chaotic map, wherein a Markov partition identifies the symbolic states and the transitions associated to the input bits.

12. A data coding system comprising:
- a pseudo-chaotic data encoder for pseudo-chaotically encoding digital data, the pseudo-chaotic data encoder comprising a shift register for shifting the digital data and a digital signal processor for translating shifted digital data according to a selected chaotic map;
- a digital to analog converter for converting the pseudo-chaotically shifted and translated digital data;
- a modulator for modulating output of the digital to analog converter for transmission on a communication channel; and
- a receiver for demodulating and decoding the pseudo-chaotically coded data from the signal, the decoding comprising Viterbi detection matched to the chaotic map with N or fewer than N states.

13. The data coding system according to claim 12, further comprising an output mapper that reconstructs the transmitted message given the estimated sequence of states provided by the detector.

14. The data coding method according to claim 12, further comprising a step of randomizing the digital data prior to said step of pseudo-chaotically encoding.

15. The data coding method according to claim 14, wherein said step of randomizing comprises a step of compressing the digital data according to a data compression algorithm.

16. The data coding method according to claim 14, wherein said step of randomizing comprises scrambling the data according to a scrambling algorithm.

* * * * *

UNITED STATES PATENT AND TRADEMARK OFFICE
CERTIFICATE OF CORRECTION

PATENT NO. : 6,882,689 B2
DATED : April 19, 2005
INVENTOR(S) : Maggio et al.

It is certified that error appears in the above-identified patent and that said Letters Patent is hereby corrected as shown below:

<u>Column 5,</u>
Line 35, "$x_{k+1}=1-2|x_k-0.5$" and insert -- $x_{k+1}=1-2|x_k-0.5|$ --

Signed and Sealed this

Second Day of August, 2005

JON W. DUDAS
*Director of the United States Patent and Trademark Office*